United States Patent
Swartz

(10) Patent No.: US 8,379,638 B2
(45) Date of Patent: Feb. 19, 2013

(54) SECURITY ENCAPSULATION OF ETHERNET FRAMES

(75) Inventor: Troy A. Swartz, Chapel Hill, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 808 days.

(21) Appl. No.: 11/526,840

(22) Filed: Sep. 25, 2006

(65) Prior Publication Data
US 2008/0075073 A1 Mar. 27, 2008

(51) Int. Cl.
- H04L 12/28 (2006.01)
- H04J 3/00 (2006.01)
- G06F 15/16 (2006.01)

(52) U.S. Cl. ......... 370/389; 370/394; 370/474; 709/227

(58) Field of Classification Search ................. 370/118, 370/221–395; 380/256; 709/218–238; 713/150–171
See application file for complete search history.

(56) References Cited

U.S. PATENT DOCUMENTS

| | | | |
|---|---|---|---|
| 4,881,263 A | 11/1989 | Herbison et al. | |
| 5,237,611 A | 8/1993 | Rasmussen et al. | |
| 5,303,303 A | 4/1994 | White | |
| 5,577,209 A | 11/1996 | Boyle et al. | |
| 5,940,591 A | 8/1999 | Boyle et al. | |
| 6,035,405 A | 3/2000 | Gage et al. | |
| 6,061,600 A | 5/2000 | Ying | |
| 6,111,876 A * | 8/2000 | Frantz et al. | 370/392 |
| 6,122,378 A * | 9/2000 | Yoshiura et al. | 380/217 |
| 6,148,405 A * | 11/2000 | Liao et al. | 726/2 |
| 6,173,399 B1 | 1/2001 | Gilbrech | |
| 6,275,588 B1 * | 8/2001 | Videcrantz et al. | 380/255 |
| 6,275,859 B1 | 8/2001 | Wesley et al. | |
| 6,330,562 B1 | 12/2001 | Boden et al. | |
| 6,393,500 B1 * | 5/2002 | Thekkath | 710/35 |
| 6,484,257 B1 | 11/2002 | Ellis | |
| 6,556,547 B1 | 4/2003 | Srikanth et al. | |
| 6,591,150 B1 | 7/2003 | Shirota | |
| 6,658,114 B1 | 12/2003 | Farn et al. | |
| 6,697,857 B1 | 2/2004 | Dixon et al. | |
| 6,708,218 B1 | 3/2004 | Ellington, Jr. et al. | |
| 6,711,679 B1 | 3/2004 | Guski et al. | |
| 6,823,462 B1 | 11/2004 | Cheng et al. | |
| 6,915,431 B1 * | 7/2005 | Vasudevan et al. | 713/171 |
| 6,915,437 B2 | 7/2005 | Swander et al. | |
| 6,920,559 B1 | 7/2005 | Nessett et al. | |
| 6,981,139 B2 | 12/2005 | Enokida | |
| 6,986,061 B1 | 1/2006 | Kunzinger | |
| 7,103,784 B1 | 9/2006 | Brown et al. | |
| 7,269,639 B1 * | 9/2007 | Lawrence | 709/220 |

(Continued)

OTHER PUBLICATIONS

Frankel, S. "Demystifying the IPsec Puzzle," Artech House, Ch. 5, pp. 87-127, Ch. 9, pp. 179-205 (2001).

Primary Examiner — Man Phan
(74) Attorney, Agent, or Firm — Hamilton, Brook, Smith & Reynolds, P.C.

(57) ABSTRACT

A technique for encapsulating data packets at a Data Link Layer to provide security functions. The technique first encrypts a payload to provide an encrypted payload. The encrypted payload is inserted in an output encapsulated frame. Also added to the output encapsulated frame is an encapsulation header that includes security information, such as a security packet index (SPI) value used to identify a security association (SA). Because the output encapsulated frame may now be longer than maximum allowed Ethernet Path Maximum Transmission Unit (PMTU), the encapsulation header also preferably includes a fragmentation field. The fragmentation field supports the ability to fragment the encrypted datagrams into smaller pieces.

10 Claims, 4 Drawing Sheets

U.S. PATENT DOCUMENTS

| | | | |
|---|---|---|---|
| 7,321,599 B1* | 1/2008 | Yen et al. | 370/466 |
| 7,366,894 B1* | 4/2008 | Kalimuthu et al. | 713/153 |
| 7,398,386 B2* | 7/2008 | Kessler et al. | 713/150 |
| 7,817,634 B2* | 10/2010 | Coffman et al. | 370/392 |
| 7,953,389 B2* | 5/2011 | Coleman et al. | 455/410 |
| 7,990,985 B2* | 8/2011 | Chen | 370/401 |
| 2001/0050903 A1* | 12/2001 | Vanlint | 370/252 |
| 2002/0061030 A1* | 5/2002 | Iny | 370/449 |
| 2002/0154782 A1 | 10/2002 | Chow et al. | |
| 2002/0162026 A1 | 10/2002 | Neuman et al. | |
| 2003/0135753 A1 | 7/2003 | Batra | |
| 2003/0172144 A1* | 9/2003 | Henry et al. | 709/223 |
| 2003/0172307 A1* | 9/2003 | Henry et al. | 713/201 |
| 2003/0191937 A1 | 10/2003 | Balissat et al. | |
| 2004/0005061 A1 | 1/2004 | Buer et al. | |
| 2004/0044891 A1 | 3/2004 | Hanzlik et al. | |
| 2004/0062399 A1 | 4/2004 | Takase | |
| 2004/0139313 A1* | 7/2004 | Buer et al. | 713/150 |
| 2004/0153643 A1* | 8/2004 | Correll et al. | 713/150 |
| 2004/0160903 A1 | 8/2004 | Gai et al. | |
| 2004/0215804 A1* | 10/2004 | Tan | 709/231 |
| 2004/0268124 A1 | 12/2004 | Narayanan | |
| 2005/0010765 A1 | 1/2005 | Swander et al. | |
| 2005/0066159 A1 | 3/2005 | Poussa et al. | |
| 2005/0125684 A1 | 6/2005 | Schmidt | |
| 2005/0138369 A1 | 6/2005 | Lebovitz et al. | |
| 2005/0149732 A1 | 7/2005 | Freeman et al. | |
| 2005/0190758 A1 | 9/2005 | Gai et al. | |
| 2006/0029102 A1* | 2/2006 | Abe et al. | 370/474 |
| 2006/0072748 A1 | 4/2006 | Buer | |
| 2006/0072762 A1 | 4/2006 | Buer | |
| 2006/0155981 A1* | 7/2006 | Mizutani et al. | 713/150 |
| 2008/0005558 A1* | 1/2008 | Hadley et al. | 713/159 |
| 2008/0229095 A1* | 9/2008 | Kalimuthu et al. | 713/153 |

* cited by examiner

SECURITY ENCAPSULATION OF ETHERNET FRAMES

BACKGROUND OF THE INVENTION

This invention relates generally to communication networks and in particular to a technique for securing communication at the Data Link Layer (layer 2) of the Open System Interconnection (OSI) Reference Model. The Data Link Layer may provide for reliable transfer of information across the physical layer.

Data transferred over many communication networks are typically sent unsecured, without the benefit of encryption and/or strong authentication of the sender. Sending unsecured data on a communication network may make the data vulnerable to being intercepted, inspected, modified and/or redirected. To make data less prone to these vulnerabilities, many networks employ various security standards and protocols to secure network traffic transferred in their networks. This secured network traffic is typically transferred using data packets that are encoded according to a security standard and/or protocol. As used herein, a secure data packet is a data packet that has been secured using a security standard and/or protocol. Likewise, as used herein, an unsecured data packet is a data packet that has not been secured using a security standard and/or protocol.

One well-known widely-used standard for securing Internet Protocol (IP) traffic is the IP security (IPsec) standard. The IPsec standard comprises a collection of protocols that may be used to transfer secure data packets in a communication network. IPsec operates at layer-3 (L3) which is the network layer of the Open Systems Interconnection Reference Model (OSI-RM). A description of IPsec may be found in Request for Comments (RFC) 2401 through RFC 2412 and RFC 4301 through RFC 4309 all of which are available from the Internet Engineering Task Force (IETF). Two cryptographic protocols that are commonly used to encapsulate IPsec packets are the Authentication Header (AH) protocol and the Encapsulating Security Payload (ESP) protocol.

The AH protocol is primarily used to provide connectionless integrity and authentication of IP datagram traffic. The authentication enables the origin of the traffic to be verified and ensure that the traffic has not been altered in transit. Authentication and integrity of an IP packet is achieved using a keyed one-way hash function, such as Message Digest algorithm 5 (MD5) or Secure Hash Algorithm-1 (SHA-1), in combination with a secret that is shared between a sender of the packet and a receiver of the packet.

Like the AH protocol, the ESP protocol provides a means to authenticate and verify the integrity of IP traffic carried in a secured packet. In addition, the ESP protocol provides a means to encrypt the IP traffic to prevent unauthorized interception of the IP traffic. Like the AH protocol, the ESP uses an ICV to authenticate and check the integrity of a packet. Encryption is used to secure the IP traffic. Encryption is accomplished by applying an encryption algorithm to the IP traffic to encrypt it. Encryption algorithms commonly used with IPsec include Data Encryption Standard (DES), triple-DES and Advanced Encryption Standard (AES).

A payload of an Ethernet packet may be encrypted, however encryption of the payload itself does not support authentication or other security functions as per IPsec. For example, IEEE 802.1AE Media Access Control Security (MACsec) standard integrates security protection into wired Ethernet to secure local area networks (LANs) from attacks. However, IEEE 802.1AE provides only hop-by-hop security, and not complete end-to-end security.

SUMMARY OF THE INVENTION

What is needed is a way to provide security to provide functions such as data origin authentication, data integrity, and data confidentiality transferred over a Data Link Layer (layer 2) of the Open System Interconnection (OSI) Reference Model without requiring modification of higher layers.

The present invention provides a technique for encapsulating data packets at a Data Link Layer to provide security functions. Starting with an input frame, that may be standard Ethernet frame having an original header and a payload, the technique first encrypts the payload to provide an encrypted payload. The encrypted payload is inserted in an output encapsulated frame. Also added to the output encapsulated frame is an encapsulation header that includes security information, such as a security packet index (SPI) value used to identify a security association (SA).

Because the output encapsulated frame may now be longer than maximum allowed Ethernet Path Maximum Transmission Unit (PMTU), the encapsulation header also preferably includes a fragmentation field. The fragmentation field supports the ability to fragment the encrypted datagrams into smaller pieces, i.e., pieces that are small enough to meet a PMTU requirement.

Moreover, in order to support features such as virtual local area network (VLAN) per IEEE 802.1Q and/or Multi-Protocol Label Switching (MPLS) both VLAN tags and MPLS labels may be included in the header of the output encapsulated frame.

Optional features of the encapsulation header may include further fields such as a peer data flag to identify peer to peer encrypted traffic and other elements that, for example, may include an initialization vector used for the encryption/decryption processing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Figure 1:
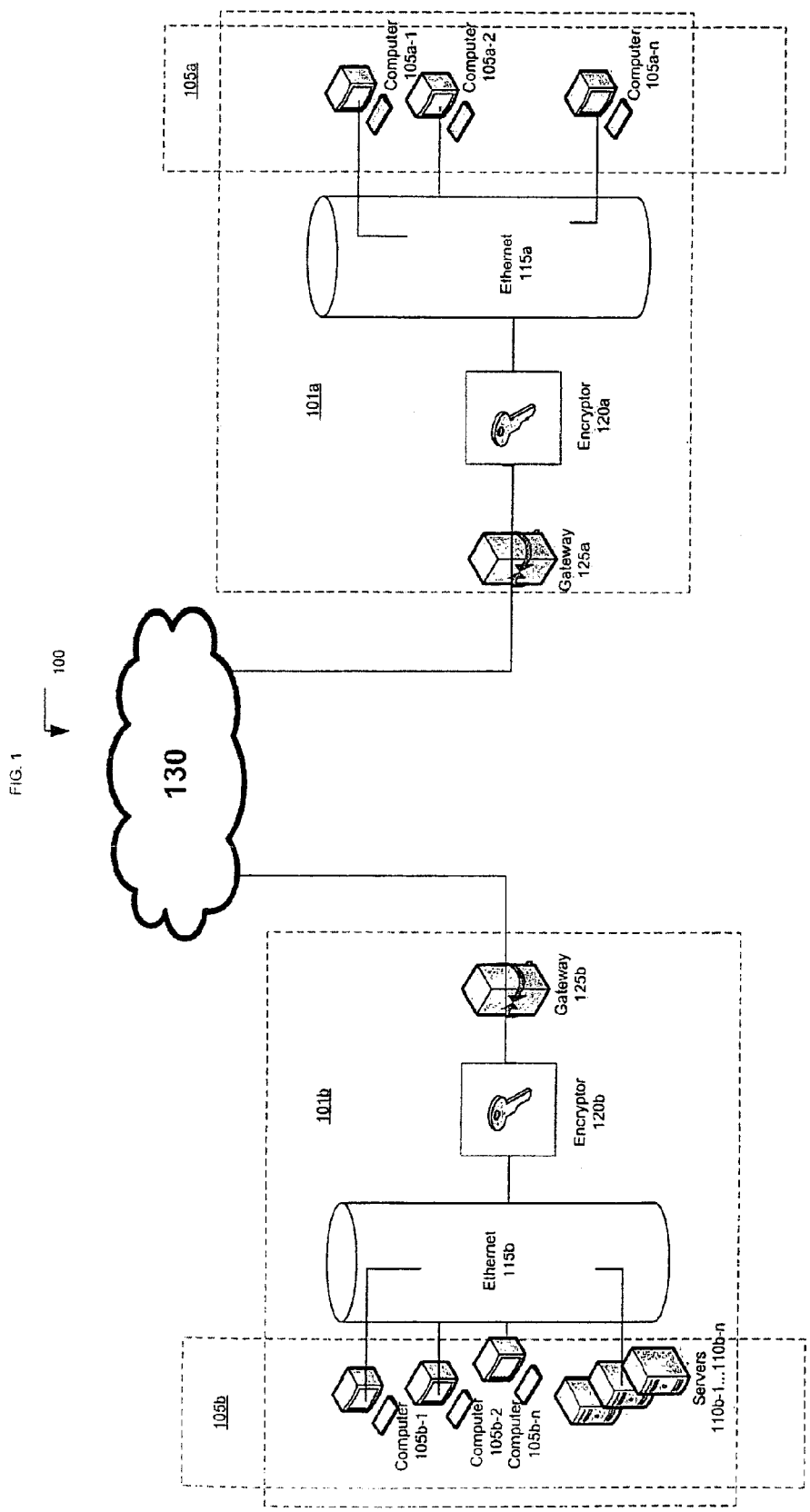
FIG. 1 is a high level diagram of a computer network that may provide security encapsulation of Ethernet frames in accordance with one embodiment of the invention.

FIG. 1 is a high level diagram of a network 100 that consists of sub-network 101a and sub-network 101b interconnected by a wide area network 130. An exemplary sub-network 101a consists of a number of customer premises equipment that may receive and provide communications in the wide area network 130. The customer premises equipment 105a may include Ethernet enabled devices such as personal computers, workstations, file servers, printers, Internet Protocol (IP) telephones, IP video devices and the like (e.g. 105a-1, 105a-2, . . . , 105a-n).

The customer premises equipment 105a may be interconnected by a local Ethernet network 115a. An encryptor appliance 120a is disposed in line between the Ethernet network 115a and internetworking devices such as a gateway 125a. The gateway 125a provides connectivity into network 130 so that customer premises equipment 105a may communicate with other customer premises equipment 105b connected to network 130 such as computer terminals 105b-1, 105b-2, . . . , 105b-n and servers 110b-1, . . . , 110b-n in sub-network 101b.

Sub-network 101b may be similar to sub-network 101a. Sub-network 101b may include gateway 125b and encryptor appliance 120b that couple to Ethernet network 115b to provide network connectivity to customer premises equipment 105b. Customer premises equipment 105b may include Ethernet enabled devices such as personal computers, workstations, file servers, printers, Internet Protocol (IP) telephones, IP video devices and the like (e.g. 105b-1, 105b-2 . . . 105b-n).

In-line encryptor appliances 120a and 120b examine packet traffic traveling, respectively, between Ethernet 115a and gateway 120a and Ethernet 115b and gateway 120b. The line encryptor appliances 120a and 120b may modify the format of Ethernet packets according to the present invention. In particular, the encryptor appliances 120a and 120b apply a security protocol to Ethernet frames that provide data origin authentication, data integrity and data confidentiality through the use of security encapsulation of the Ethernet payload. Information concerning the security protocol to be applied, such as encryption keys, security associations, policies and the like, are provided to appliances 120 from elsewhere in the network.

Figure 2:
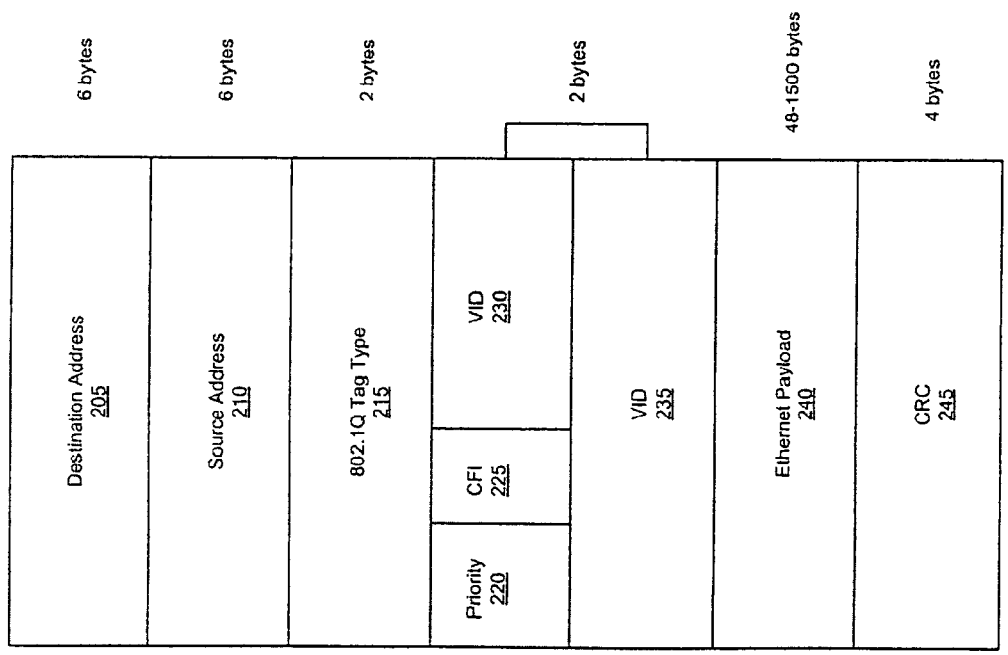
FIG. 2 is a diagram of a standard Ethernet frame format in accordance with one embodiment of the invention.

Packets incoming to encryptor 120a from sub-network 101a or exiting encryptor 120a destined for Ethernet sub-network 101a may have the Ethernet frame format of FIG. 2. An Ethernet frame 200, as is well known in the art, consists of a header 201 including a destination address 205 of 6 bytes, a source address 210 of 6 bytes, and an 802.1Q tag type 215 of 2 bytes. The Ethernet frame 200 may also include a priority field 220 that may be used to assign a priority level, canonical format indicator (CFI) 225 to indicate the presence of a routing information field (RIF), and Virtual Local Area Network (VLAN) Identifiers (VIDs) 230 and 235. Priority field 220, CFI 225, and VIDs 230 and 235 occupy a total of 2 bytes. An Ethernet payload field 240, which may be from 48-1500 bytes long, is followed by a trailer field (cyclic redundancy check CRC 245) of 4 bytes.

Figure 3:
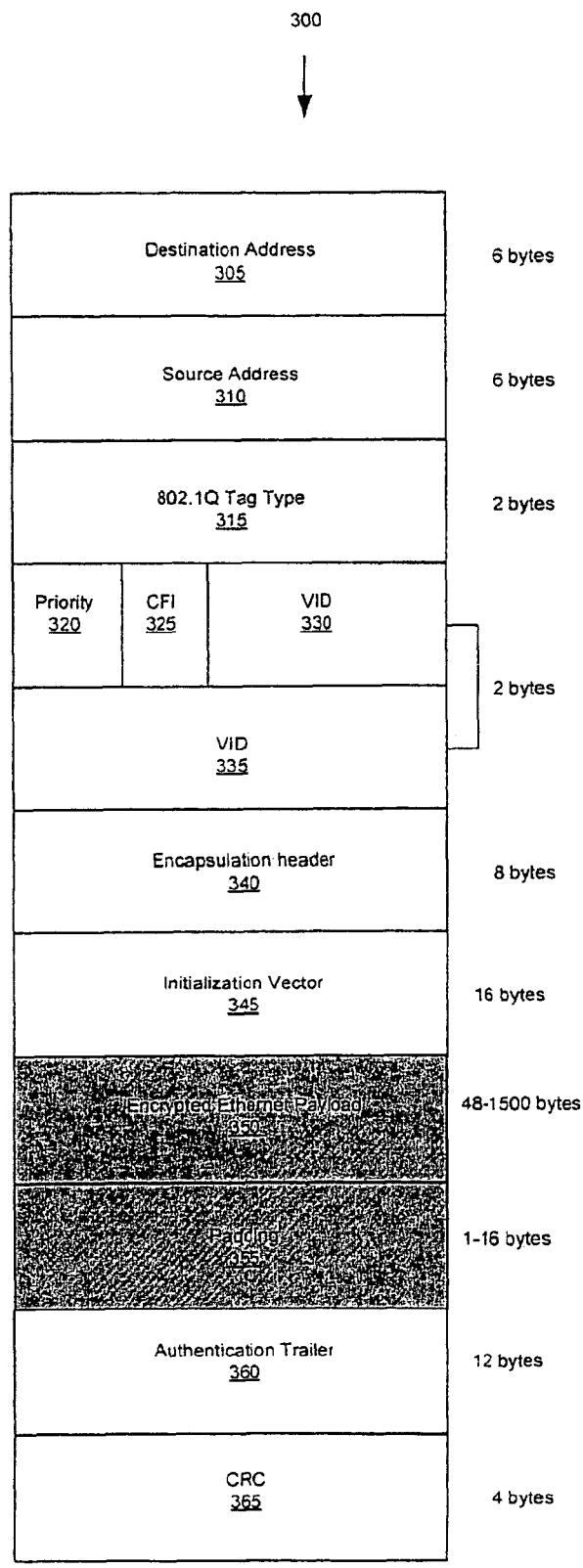
FIG. 3 is a diagram illustrating a security encapsulated Ethernet frame after techniques according to the present invention are applied.

FIG. 3 shows a detailed diagram of an output encapsulated frame 300 after being processed by encryptor 120a. Encryptor 120a receives an input Ethernet frame 200 having an original header 210 and payload 240 as shown in FIG. 2. Encryptor 120a encrypts the payload 240 to provide an Ethernet encrypted payload 350. Encryptor 120a then inserts the encrypted payload 350 in the output encapsulated frame 300, in the same place as the original payload 240. Thus output encapsulated frame 300 has the same destination address 305, source address 310, 802.1Q tag type 315, priority 320, CFI 325, VID fields 330 and 335 as the original Ethernet frame 200.

However, also included in the output encapsulated frame 300 are an encapsulation header 340 and initialization vector 345, encrypted Ethernet payload 350, padding 355 and authentication trailer 360. In addition it should be understood that the CRC field 365 would be different for the encapsulated packet 300.

If the original Ethernet frame 200 supports features such as VLAN per IEEE 802.1Q and/or Multi-Protocol Label Switching (MPLS) both VLAN tags and MPLS labels may be copied into the encapsulated packets header in the same location and without modification. However, the Ethernet payload in the original packet 240 becomes the encrypted Ethernet payload 350 in the outgoing encrypted Ethernet frame 300.

The Ethernet payload 350 may be encrypted using encryption algorithm such as the AES-256 CBC encryption algorithm. With the AES-256 CBC encryption algorithm, a padding filed 355 of from 1 to 16 bytes is added to the payload to adhere to encryption algorithm's 128-bit block size requirement. The shaded area of FIG. 3 (i.e., encrypted Ethernet payload 350 and padding 355) illustrates the portion of the packet that is encrypted. With the required padding the encrypted payload is typically longer than the original payload.

Figure 4:
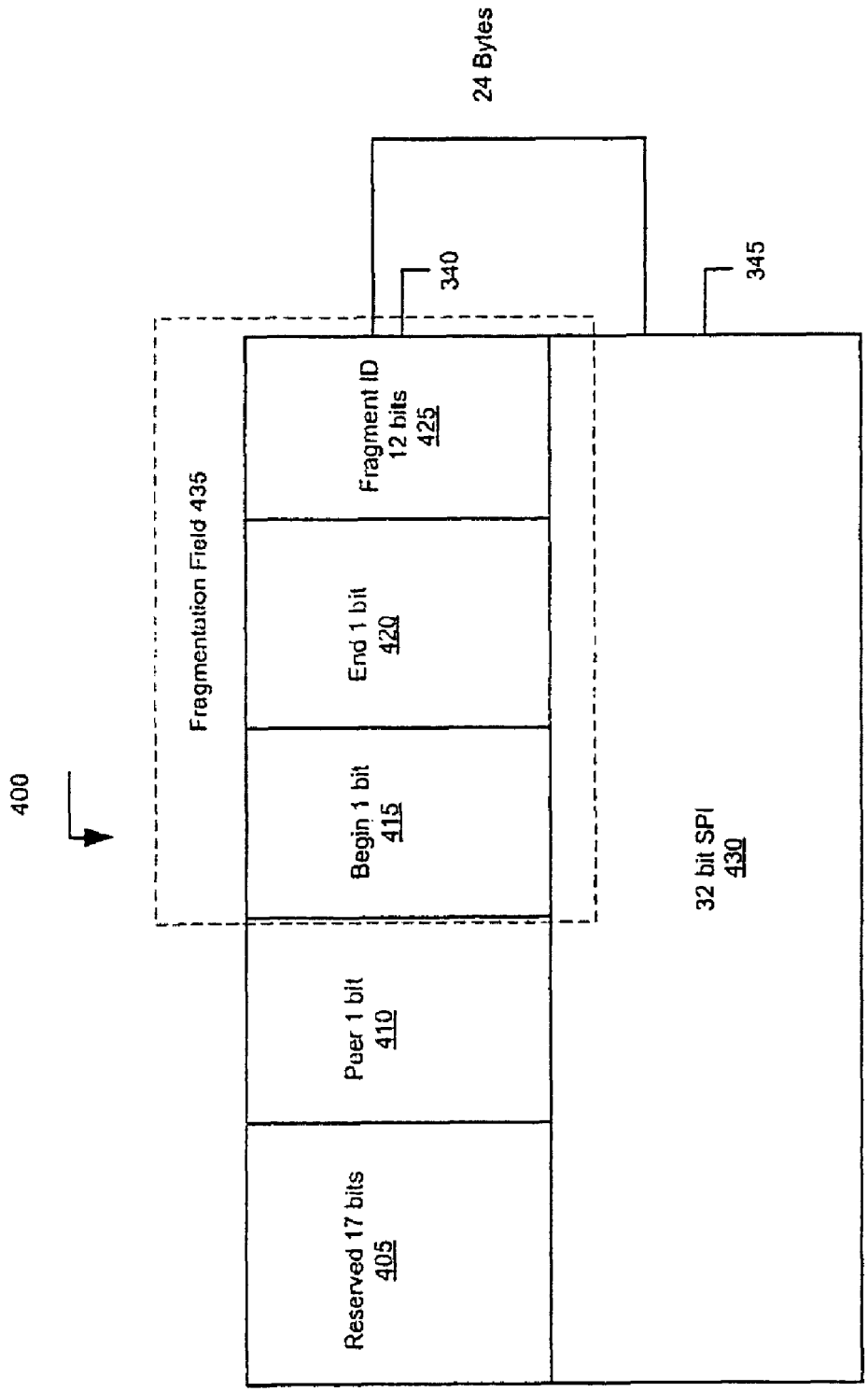
FIG. 4 is a more detailed view of an encapsulation header and initialization vector portion of the encapsulated Ethernet frame in accordance with the example embodiment of the invention.

FIG. 4 shows the encapsulation header 340 and initialization vector 345 portion of encapsulated frame 300 in more detail. Encapsulation header 340 and initialization vector 345 together comprising a 24 byte field that is preferably inserted before the encrypted payload 340 of encapsulated packet 300. Encapsulation header 340 may include at least a 17-bit reserved field 405, 1-bit peer field 410, and 14-bit fragmentation field 435.

The fragmentation field 435 allows encrypted datagrams to be fragmented into pieces that are small enough to pass over a communication link having a smaller path maximum transmission unit (PMTU) than the originally encapsulated datagram. In particular, certain networks require strict observation of the limitation on frame size; however, encryption of the payload portion of the frame may cause it to exceed the maximum allotted PMTU size, (i.e., 1500 bytes in some networks). The fragmentation field 435 includes a 12-bit fragment ID field 425, 1-bit begin fragment flag 415, and 1-bit end fragment flag 420. Field 425 and flags 415 and 420 enable reconstruction of a fragmented encrypted frame, such as by marking a first frame with the begin fragment flag 415, and an end frame with the end flag 420.

Also included is a 32-bit security parameters index (SPI) value field 430. This permits identification of a security association used to encapsulate and encrypt the packet. For example, an SA according to the IPsec standard may be used to determine an SPI value field.

The 1-bit peer data flag 410 may be used to identify a peer to peer encryptor traffic. In particular, the peer-to-peer flag is set when encryptor 120a sends a message to encryptor 120b without involving the customer premises equipment 105a and 105b. Such a message, for example, may include exchanges of security association information in order to authenticate end-to-end communication, set up secure tunnels or other management functions.

Finally, hashing algorithms such as the SHA-1 algorithm is then performed on the entire encrypted packet 300 to result in the CRC value 32. The integrity check value produced by the hashing algorithm and the packet CRC value 32 are then appended to the Ethernet encrypted payload 350 to produce the encrypted encapsulated packet 300.

As can be understood now the present invention provides for the ability to apply security encapsulation to Ethernet frames providing an advantage over prior art approaches to network security.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing security functions to data packets at the data link layer of the Open Systems Interconnection Reference Model, the method comprising:
   receiving, at the data link layer, a data packet having an Ethernet frame having an original header and original payload;
   encrypting, at the data link layer, the original payload to provide an encrypted payload that is longer than the original payload;
   fragmenting, at the data link layer, the encrypted payload into first and second output Ethernet frames if the size of the encrypted payload would result in the first output Ethernet frame exceeding a Path Maximum Transmission Unit limit for the data link layer;
   determining an encapsulation header for each of the first and second output Ethernet frames, the encapsulation header including a non-encrypted fragmentation field containing information to enable, at the data link layer, reconstruction of the encrypted payload from the first and second output Ethernet frames;
   constructing, at the data link layer, the first and second output Ethernet frames from the original header, the encapsulation header, and the encrypted payload, to provide security functions to the data packet at the data link layer.

2. The method of claim 1 additionally comprising:
   determining an integrity check value for the encrypted payload.

3. The method of claim 1 additionally comprising:
   appending the integrity check value to the encrypted payload.

4. The method of claim 1 wherein the Ethernet frame further comprises:
   a Virtual Network Identifier (VID); and
   the first and second output Ethernet frames further comprise the VID.

5. The method of claim 1 wherein the encapsulation header includes a security association comprising a Security Parameters Index (SPI) value.

6. An apparatus operating at the data link layer of the Open Systems Interconnection Reference Model, the apparatus comprising:
   a receiver for receiving, at the data link layer, a data packet having an Ethernet frame having an original header and original payload;
   a packet processor communicatively coupled to the receiver, the packet processor configured to:
   encrypt, at the data link layer, the original payload to provide an encrypted payload that is longer than the original payload;
   fragment, at the data link layer, the encrypted payload into first and second output Ethernet frames if the size of the encrypted payload would result in the first output Ethernet frame exceeding a Path Maximum Transmission Unit limit for the data link layer;
   determine an encapsulation header for each of the first and second output Ethernet frames, the encapsulation header including a non-encrypted fragmentation field containing information to enable, at the data link layer, reconstruction of the encrypted payload from the first and second output Ethernet frames; and
   construct, at the data link layer, the first and second output Ethernet frames from the original header, the encapsulation header, and the encrypted payload, to provide security functions to the data packet at the data link layer.

7. The apparatus of claim 6 wherein the packet processor further determines an integrity check value for the encrypted payload.

8. The apparatus of claim 7 wherein the packet processor additionally appends the integrity check value to the encrypted payload.

9. The apparatus of claim 6 wherein the Ethernet frame further comprises a Virtual Network Identifier (VID), and the first and second output Ethernet frames further comprise the VID.

10. The apparatus of claim 6 wherein the encapsulation header includes a security association comprising a Security Parameters Index (SPI) value.

* * * * *